US006371513B1

(12) United States Patent
Fujimoto et al.

(10) Patent No.: US 6,371,513 B1
(45) Date of Patent: Apr. 16, 2002

(54) SIDE AIRBAG APPARATUS (75) Inventors: Osamu Fujimoto, Nissin; Makoto Hamada, Toyota, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/386,418

(22) Filed: Aug. 31, 1999

(30) Foreign Application Priority Data

Sep. 16, 1998 (JP) ............................... 10-261426

(51) Int. Cl.[7] ........................ B60R 21/22; B60R 21/32
(52) U.S. Cl. ...................... 280/730.2; 280/735; 701/49
(58) Field of Search ........................... 280/735, 730.2, 280/730.1, 734; 701/36, 49

(56) References Cited

U.S. PATENT DOCUMENTS

| 5,482,314 A | * | 1/1996 | Corrado et al. ............ 280/735 |
| 5,612,876 A | | 3/1997 | Zeidler et al. |
| 5,702,123 A | | 12/1997 | Takahashi et al. |
| 5,722,686 A | * | 3/1998 | Blackburn et al. .......... 280/735 |
| 5,732,375 A | * | 3/1998 | Cashler ...................... 280/735 |
| 5,739,757 A | * | 4/1998 | Gioutsos ..................... 280/735 |
| 5,948,031 A | * | 9/1999 | Jinno et al. ................. 280/735 |
| 5,964,478 A | * | 10/1999 | Stanley et al. .............. 280/735 |
| 5,983,147 A | * | 11/1999 | Krumm ....................... 280/735 |
| 6,014,602 A | * | 1/2000 | Kithil et al. ................ 280/735 |
| 6,018,693 A | * | 1/2000 | Blackburn et al. ............ 701/36 |
| 6,026,340 A | * | 2/2000 | Corrado et al. ............ 280/735 |
| 6,056,079 A | * | 5/2000 | Cech et al. ................ 280/735 |
| 6,070,115 A | * | 5/2000 | Oestreicher et al. ........ 280/735 |
| 6,101,436 A | * | 8/2000 | Fortune et al. .............. 701/36 |
| 6,104,972 A | * | 8/2000 | Miyamoto et al. ............ 701/36 |
| 6,116,640 A | * | 9/2000 | Tanaka et al. .............. 280/735 |
| 6,123,355 A | * | 9/2000 | Sutherland ............... 280/730.2 |
| 6,138,067 A | * | 10/2000 | Cobb et al. .................. 701/36 |
| 6,151,540 A | * | 11/2000 | Anishetty .................... 280/735 |
| 6,158,768 A | * | 12/2000 | Steffens, Jr. et al. ........ 280/735 |
| 6,263,271 B1 | * | 7/2001 | Oka et al. ................... 280/735 |
| 6,292,727 B1 | * | 9/2001 | Norton ...................... 280/735 |
| 6,302,438 B1 | * | 10/2001 | Stopper, Jr. et al. ........ 280/735 |

FOREIGN PATENT DOCUMENTS

| JP | 5-116589 | 5/1993 |
| JP | 7-270541 | 10/1995 |
| JP | 8-72665 | 3/1996 |

* cited by examiner

Primary Examiner—Brian L. Johnson
Assistant Examiner—Matthew Luby
(74) Attorney, Agent, or Firm—Pillsbury Winthrop LLP (57) ABSTRACT

A side airbag is housed together with an inflator containing a high pressure gas as a module in a door-side side portion of a seat. The side airbag is deployed into a space between the door and an occupant sitting in the seat, on the basis of an instruction signal from an airbag control device. An occupant sensor is disposed at a position that is located in an upper portion of a seatback of the seat and shifted from a center of the seatback with respect to directions of a width thereof toward a vehicle body center. By using the occupant sensor, it is determined whether an occupant is present at a seat of a vehicle, excluding a case where an occupant having a constitution smaller than a predetermined constitution is leaning against the side vehicle body portion. The airbag control device permits operation of the side airbag if presence of an occupant is detected by the occupant sensor. The control device prohibits operation of the side airbag if absence of an occupant is detected by the occupant sensor.

23 Claims, 9 Drawing Sheets

SIDE AIRBAG APPARATUS

INCORPORATION BY REFERENCE

The entire disclosure of Japanese Patent Application No. Hei 10-261426 filed on Sep. 16, 1998 including the specification, drawings and abstract is incorporated herein by reference in its entirety.

BACKGROUND OF THE INVENTION

1. Field of the Invention

The present invention relates to an airbag apparatus for protecting an occupant from an impact at the time of a crash of a vehicle and, more particularly, to a side airbag apparatus for protecting an occupant from an impact exerted sideways relative to a vehicle body.

2. Description of the Related Art

Airbag apparatuses that deploy an airbag to protect an occupant at the time of a vehicle crash are in widespread use.

However, such an airbag apparatus may fail to sufficiently protect an occupant depending on the posture or state of the occupant. For example, a front impact airbag apparatus that deploys an airbag into a space between an occupant and an instrument panel to protect the occupant may fail sufficient protect if there is insufficient space to deploy the airbag or if there is insufficient time to deploy the airbag because the occupant is at a position too near the instrument panel, e.g., when the occupant is sitting on a front edge portion of the seat.

Recently, many motor vehicles have been equipped with airbag apparatuses for seats other than the driver's seat, for example, a passenger-side front seat. Since it is difficult to restore a once-deployed airbag to a state that the airbag can be used again, it is desirable that an airbag apparatus for a passenger-side front seat or the like be controlled so that the airbag will be deployed only when there is an occupant in the passenger-side front seat or the like.

It is advantageous to be able to control the operation of the airbag apparatus in accordance with the presence or absence of an occupant, the sitting posture of an occupant, and the like. Various apparatuses as described below have recently been proposed and put into practical use.

For example, Japanese Patent Application Laid-open No. HEI 7-285364 describes an apparatus that detects whether an occupant is sitting at a non-appropriate position prescribed for the airbag, for example, at a front edge portion of the seat, by using pressure sensors disposed in a front portion and a rear portion of the seat cushion. Upon detecting that an occupant is out of the prescribed sit position, the apparatus warns the occupant. The apparatus is also able to prevent the starting operation of the airbag if the occupant is out of the prescribed position.

Japanese Patent Application Laid-open No. HEI 7-270541 describes an apparatus capable of detecting the presence or absence of an occupant of a seat by using a sensor that detects a permittivity change of a dielectric member disposed in a seat cushion, although the apparatus is not specifically designed for an airbag.

Japanese Patent Application Laid-open No. HEI 8-268220 describes an apparatus that detects whether an occupant of a seat is present or whether an occupant is in such a posture that the occupant is close to the instrument panel, by using an ultrasonic sensor disposed in a compartment ceiling or the like. The apparatus changes the mode of operation of the airbag in accordance with the result of detection.

The aforementioned apparatuses make it possible to appropriately control the operation of the airbag in accordance with the presence or absence of an occupant or the sitting posture of an occupant at the time of an impact to a front portion of the vehicle, that is, a frontal collision.

Besides the above-described airbag apparatuses, side airbag apparatuses for protecting an occupant at the time of an impact to a side of a vehicle body, that is, a side collision, have been proposed and used. A typical side airbag apparatus deploys a side-impact airbag (side airbag) into a space between an occupant and a side portion of the vehicle body at the time of a side collision so as to protect the occupant, more specifically, side portions of the occupant's body, from an impact caused by the side collision or a compression caused by deformation of the vehicle body. Such a side airbag apparatus is normally disposed in a side portion of a seatback, a vehicle door, or the like.

The side airbag apparatuses may also fail to achieve a sufficient protecting effect depending on the sitting posture of an occupant. For example, if a side airbag is deployed when a relatively small person, for example, a child, is leaning against a side body portion of the vehicle, the protecting effect is remarkably reduced as described below.

FIGS. 11 through 14 illustrate relationships between the sitting posture of an occupant and a side airbag deployed at the time of a side collision.

Figure 11:
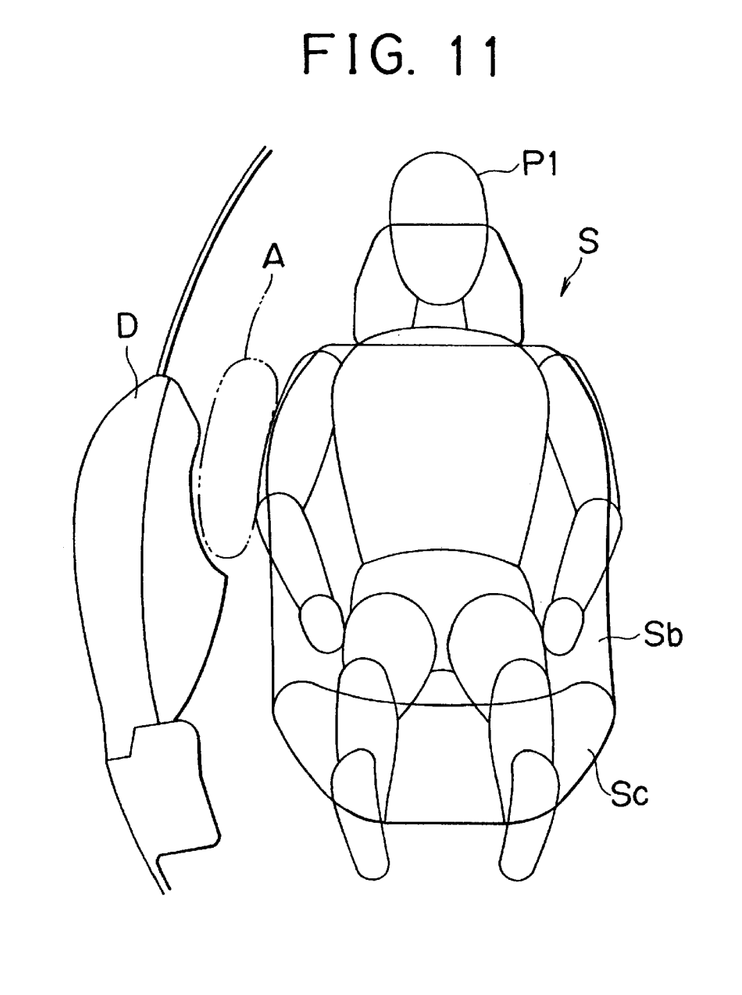
FIG. 11 is a schematic illustration of a relationship between the sitting posture of an occupant having a constitution equal to or greater than the predetermined constitution and a side airbag deployment range.
Figure 12:
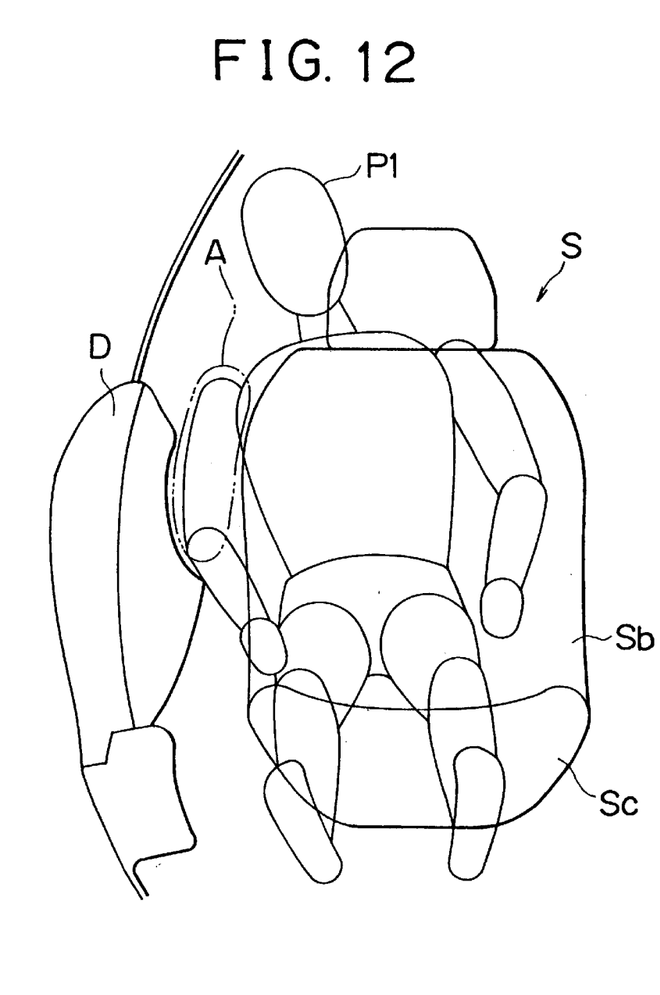
FIG. 12 is a schematic illustration of a relationship between the sitting posture of an occupant having a constitution equal to or greater than the predetermined constitution and a side airbag deployment range.
Figure 13:
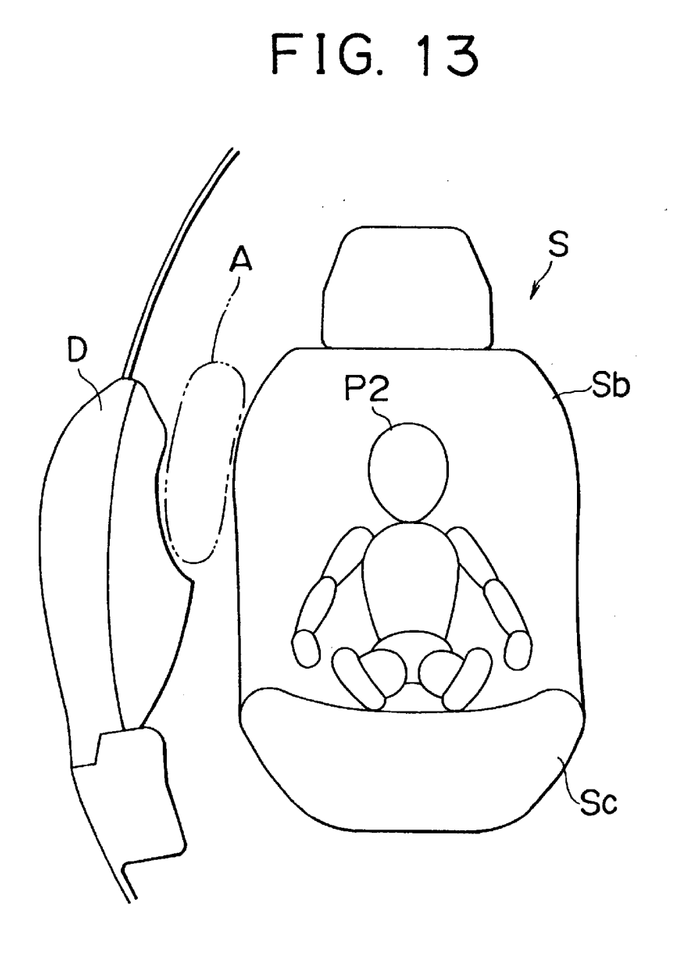
FIG. 13 is a schematic illustration of a relationship between the sitting posture of an occupant having a constitution smaller than a predetermined constitution and a side airbag deployment range.
Figure 14:
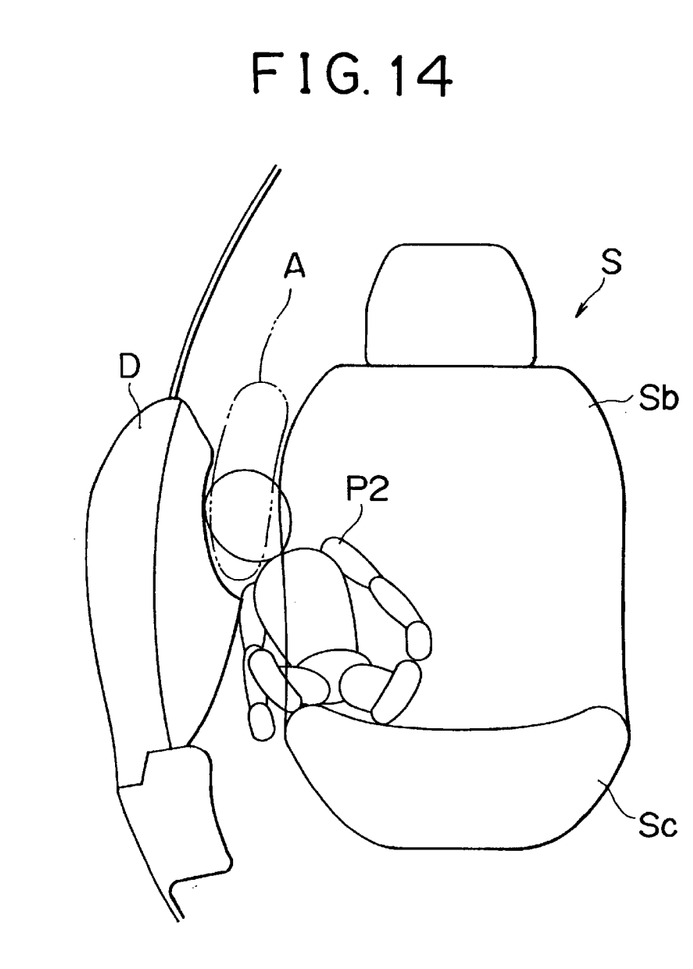
FIG. 14 is a schematic illustration of a relationship between the sitting posture of an occupant having a constitution smaller than a predetermined constitution and a side airbag deployment range.

FIG. 11 shows an average-built occupant P1 sitting in a proper posture. FIG. 12 illustrates an average-built occupant P1 leaning against a side vehicle body portion (door D). FIG. 13 illustrates a small-built occupant P2, for example, a child or the like, sitting in a proper posture. FIG. 14 illustrates a small-built occupant P2 leaning against a side vehicle body portion (door D).

If the average-built occupant P1 is sitting in a seat S in the proper sitting posture as shown in FIG. 11, the side airbag is deployed into a space A between a side portion of the trunk of the average-built occupant P1 and the door D. The side airbag is also deployed into the space A between the door D and a side portion of the trunk of the small-built occupant P2, for example, a child, if the small-built occupant P2 is sitting in the proper sitting posture as shown in FIG. 13. In these cases, a sufficiently high effect of the side airbag protecting the occupant P1, P2 from the impact at the time of a side collision or compression caused by deformation of vehicle body or the like is achieved.

If the average-built occupant P1 of the seat A is leaning against the door D, an arm or the trunk of the occupant P1 is located in the space A for deployment of the side airbag. Therefore, proper deployment of the side airbag is impeded, so that the occupant protecting effect may not be sufficiently achieved. However, even if the trunk or an arm of the average-built occupant P1 is located in the space A, the side airbag can be deployed so as to substantially achieve its protecting effect provided that there is a certain space between an upper trunk portion of the average-built occupant P1 and the door D.

If the small-built occupant P2, for example, a child or the like, sitting in the seat A is leaning against the door D as shown in FIG. 14, the head of the occupant P2 is located in the space A for deployment of the side airbag. In this case, too, there is a danger that the proper deployment of the side airbag will be impeded. Even if the side airbag is deployed, the side airbag, which is designed to be deployed to protect an occupant's trunk portion, is deployed between the head of the small-built occupant P2 and the door D. Therefore, if the small-built occupant P2 in the seat A is leaning against the door D, the occupant protecting effect of the side airbag is remarkably reduced.

The above-described apparatuses, which detect the sitting posture of an occupant at the time of a frontal collision and controls the frontal impact airbag in accordance with the result of detection, are not designed taking the operation of a side airbag into consideration. Moreover, the aforementioned apparatuses are not able to detect whether an occupant of a seat is leaning against a side vehicle body portion. Therefore, the apparatuses are not able to properly control the operation of a side airbag in accordance with the occupant sitting posture or situations as described above.

SUMMARY OF THE INVENTION

Accordingly, the present invention provides a side airbag apparatus having controllable modes of operation, the modes of operation being controlled in accordance with the presence or absence of an occupant of a seat or the sitting posture of an occupant.

In accordance with one aspect of the invention, a side airbag apparatus is provided with an occupant sensor that detects whether an occupant is present at a vehicle seat, excluding a case where an occupant having a constitution smaller than a predetermined constitution is leaning against the side vehicle body portion, and a control means for controlling operation mode of the side airbag in accordance with whether an occupant is present on the basis of detection by the occupant sensor.

Therefore, it becomes possible to discriminate a case where an occupant is not present or a small-built occupant, for example, a child or the like, is sitting in the seat and leaning against the side vehicle body portion, from other cases. Hence, in accordance with the sitting posture of an occupant or the state of occupancy of the seat, the side airbag apparatus is able to operate the side airbag in a suitable mode, for example, a mode in which the side airbag is deployed at a low pressure or a low speed, or a mode in which the side airbag is deployed stepwise in a plurality of divided stages, or the like, or to prevent unnecessary operation of the side airbag.

The control means may, based on the occupant sensor, permit operation of the side airbag if an occupant is present, and prohibit operation of the side airbag if the an occupant is not present.

Therefore, the operation of the side airbag is prohibited in a case where an occupant is not present and in a case where a small-built occupant is sitting in the seat and leaning against the side vehicle body portion. In the other cases, the operation of the side airbag is permitted. Hence, it becomes possible to prevent unnecessary operation of the side airbag.

In the side airbag apparatus, the occupant sensor may detect whether an occupant is present with respect to one of the following: a site that is located in the upper portion of a seatback and shifted from [a] the center of the seatback in a widthwise direction thereof toward a vehicle body center and a site that is located in the upper portion of the seatback of the seat and near the center of the seatback.

By detecting whether an occupant is present with respect to one of the above described sites, the occupant sensor makes it possible to discriminate a case where an occupant is not present and a case where a small-built occupant is sitting in the seat and leaning against the side vehicle body portion, from other cases. Therefore, it becomes possible to facilitate suitable operation of the side airbag in accordance with the sitting posture of an occupant and prevention of unnecessary operation of the side airbag.

In some conventional vehicles, an occupant sensor is provided in a seat cushion or the like for detecting the presence or absence of an occupant in order to control various frontal impact safety devices, for example, a frontal impact airbag, a seat belt pretensioner, a head protecting airbag (curtain shield airbag) or the like. In the above-described construction, the occupant sensor for the side airbag apparatus can also be used to control these safety devices. Through the common use of a sensor for controlling various safety devices, the entire vehicle construction can be simplified and the production cost can be reduced.

In the side airbag apparatus, the occupant sensor may have a detection range for detecting the presence of an occupant, the detection range being defined as a region that includes a vehicle body center-side body contour of an occupant having a predetermined constitution and leaning against the side vehicle body portion and that extends toward the vehicle body center.

By setting the detection range of the occupant sensor in this manner, it becomes possible to detect the presence or absence of an occupant of the seat of the vehicle, excluding the case where an occupant has a constitution smaller than the predetermined constitution and is leaning against the side vehicle body portion. Therefore, the side airbag apparatus is able to precisely discriminate the case where an occupant is not present or a small-built occupant is leaning against the side vehicle body portion from other cases, while requiring only a simple apparatus construction. Hence, it becomes possible to easily and reliably operate the side airbag in accordance with the state of sit of an occupant and prevent unnecessary operation of the side airbag.

In the side airbag apparatus, the detection range of the occupant sensor may have a shape that is defined as a generally inverted trapezoidal shape or a generally inverted triangular shape having, as an oblique line, a sloped line segment extending along the vehicle body center-side body contour of the occupant having the predetermined constitution and leaning against the side vehicle body portion.

Therefore, the side airbag apparatus becomes able to precisely discriminate the case where an occupant is not present and the case where a small-built occupant is leaning against the side vehicle body portion from other cases, while requiring only a simple apparatus construction. Hence, it becomes possible to easily and reliably operate the side airbag in accordance with the sitting posture of an occupant and prevent unnecessary operation of the side airbag.

In the side airbag apparatus, the control means may change the operation mode of the side airbag only if a state detected by the occupant sensor continues for at least a predetermined length of time. Therefore, the side airbag apparatus becomes able to prevent a false detection of an occupant.

In the side airbag apparatus, the occupant sensor may be one of a capacitance sensing type sensor and an impedance change sensing type sensor. By employing a proximity sensor of a capacitance sensing type sensor or an impedance change sensing type sensor whose detection range can easily be defined as a desired shape, the construction of the occupant sensor can be simplified.

The side airbag apparatus may further include an occupancy sensor that detects whether an occupant is sitting in the seat, the occupancy sensor being formed by a sensor other than the capacitance sensing type sensor and the impedance change sensing type sensor, and an initialization means for initializing the occupant sensor on the basis of a result of detection performed by the occupancy sensor.

The output of a capacitance sensing type or impedance change sensing type sensor changes depending on humidity, so that the detection precision of the sensor is limited. However, the above-described construction in which the occupancy sensor is provided for detecting whether an occupant is sitting in the seat, separately from the occupant sensor, and the initialization means initializes the occupant sensor on the basis of a result of detection performed by the occupancy sensor, avoids the effect of humidity on the occupancy sensor, and therefore allows a further improvement in the detection precision of the sensors. Therefore, the sitting posture of an occupant can be more reliably detected, and the operation of the side airbag can be more precisely controlled.

In the side airbag apparatus, the occupancy sensor may be a pressure sensing type sensor provided in a seat cushion of the seat.

This simple construction including the pressure sensing type sensor in the seat cushion makes it possible to detect the presence or absence of an occupant and to initialize the occupant sensor on the basis of the result of detection performed by the occupancy sensor. Therefore, the detection precision of the occupant sensor can be further improved.

In the side airbag apparatus, the initialization means may update a criterion of a value of output of the occupant sensor for determining whether an occupant is present, in accordance with a value outputted by the occupant sensor when absence of an occupant is detected by the occupancy sensor.

When the absence of an occupant is detected by the occupancy sensor, a portion of the body of an occupant is normally not present in the detection range of the occupant sensor. Therefore, by initializing the criterion for determining whether an occupant is present through the use of the occupant sensor in accordance with the value outputted by the occupant sensor, the side airbag apparatus becomes able to reliably detect the sitting posture of an occupant regardless of a change in the sensor output depending on humidity.

The initialization means may initialize the occupant sensor if a state detected by the occupancy sensor continues for at least a predetermined length of time. Therefore, the side airbag apparatus becomes able to reliably determine whether an occupant of the seat is present and prevent false initialization of the occupant sensor.

In accordance with another aspect of the invention, a side airbag apparatus for protecting an occupant by deploying a side airbag between a side portion of the occupant and a side vehicle body portion at the time of an impact, includes a sensor capable of detecting a state that an occupant having a constitution smaller than a predetermined constitution is leaning against a side vehicle body portion, wherein an operation mode of the side airbag is changed in accordance with a result of detection performed by the sensor.

Therefore, it becomes possible to detect a state that an occupant having a constitution smaller than the predetermined constitution is leaning against the side vehicle body portion. Hence, the side airbag apparatus is able to operate the side airbag in a suitable mode, for example, a mode in which the side airbag is deployed at a low pressure or a low speed, or a mode in which the side airbag is deployed stepwise in a plurality of divided stages, or the like, or to prevent unnecessary operation of the side airbag.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

First Emobodiment

A first embodiment of the side airbag apparatus of the invention will be described.

Figure 1:
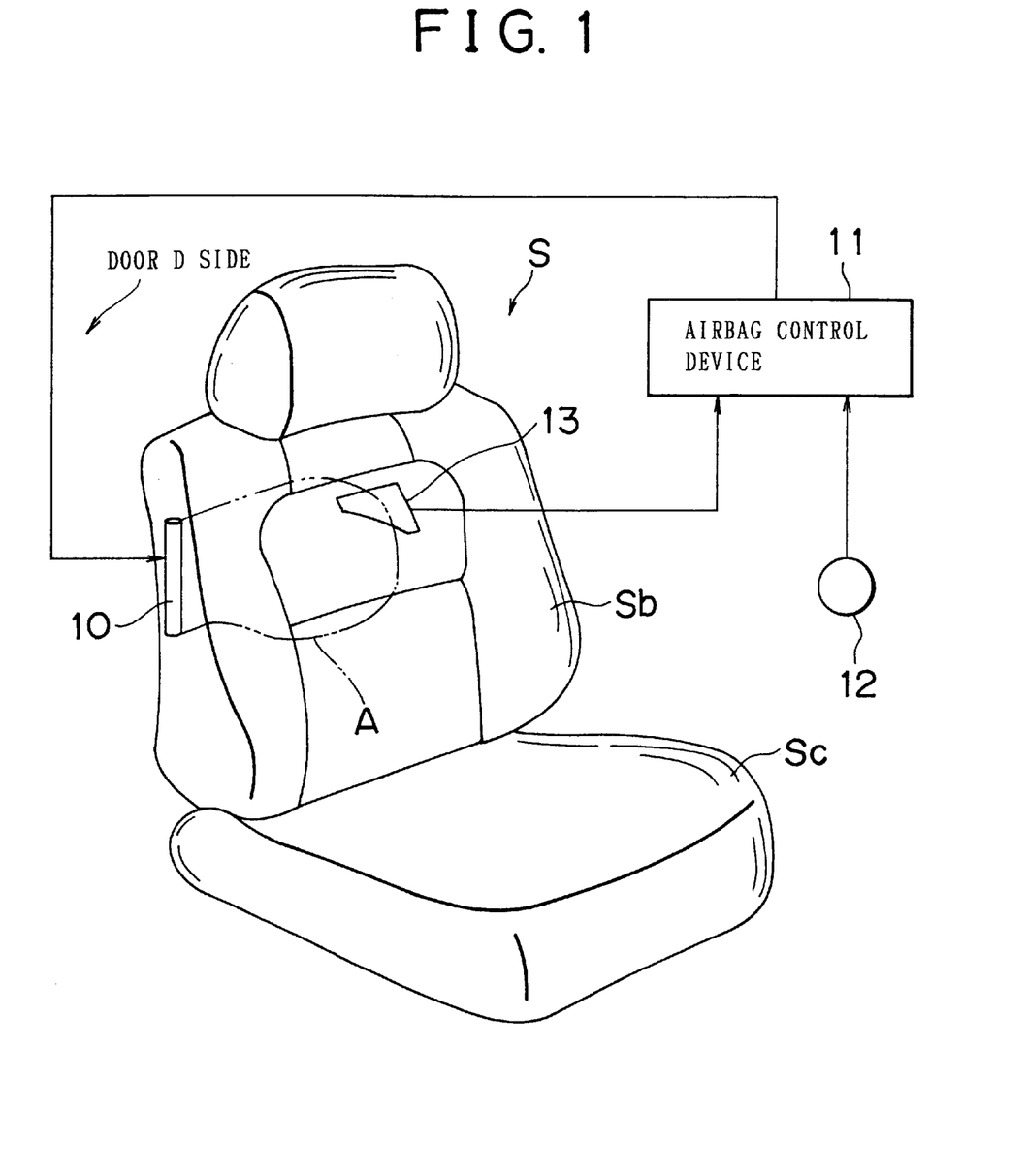
FIG. 1 is a perspective view a front seat equipped with a side airbag apparatus according to a first embodiment of the invention, together with a block diagram of an electric arrangement of the side airbag apparatus.
Figure 2:
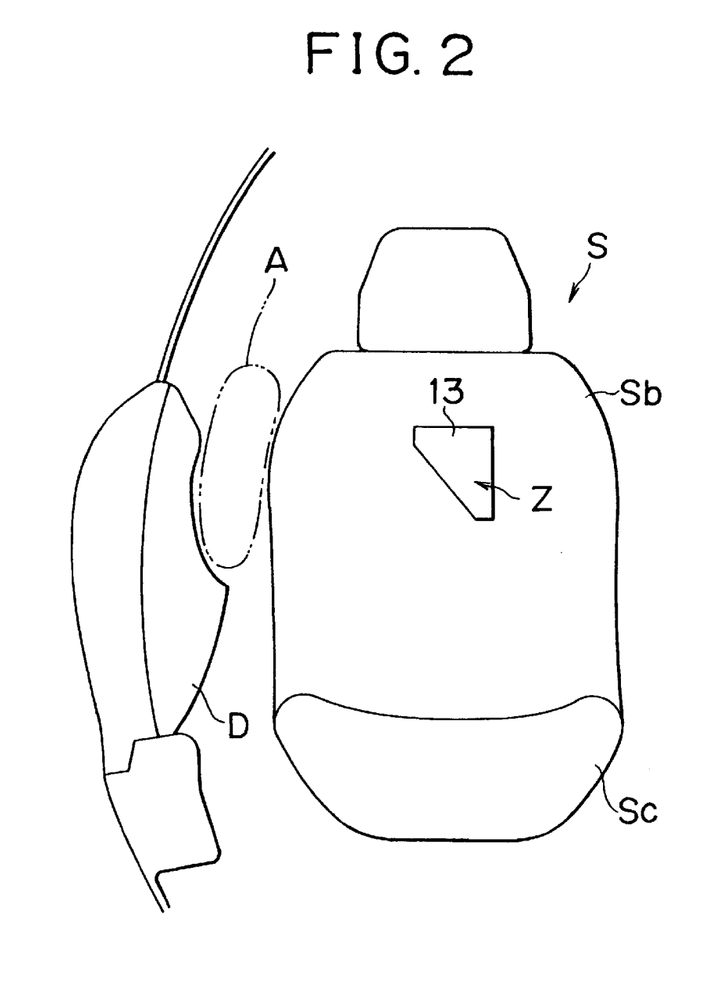
FIG. 2 is a front view of the side airbag apparatus.

FIG. 1 shows a perspective view of a front seat S equipped with a side airbag apparatus according to the first embodiment, together with a block diagram of an electric arrangement of the side airbag apparatus. FIG. 2 is an elevation of the seat S viewed from a front portion of a vehicle body.

As shown in FIGS. 1 and 2, a side airbag module 10 is disposed in a side portion of the seat S close to a door D of the vehicle (i.e., a vehicle body-side portion of the seat S). The side airbag module 10 has a side airbag and an inflator containing a high-pressure gas for deploying the side airbag. The side airbag is housed in the side airbag module 10 in a folded state.

The operation of the side airbag module 10 is controlled by a side airbag control device 11. The side airbag control device 11 determines whether to operate the side airbag (whether to deploy the side airbag) on the basis of results of detection obtained from a side impact sensor 12 for detecting a side impact and an occupant sensor 13 described below. If it is determined that the side airbag is to be operated, the side airbag control device 11 outputs an instruction signal to the side airbag module 10.

Based on the instruction signal, the inflator provided in the side airbag module 10 supplies a high pressure gas into the side airbag. Supplied with the high pressure gas, the side airbag is inflated and deployed into the space A between the seat S and the door D.

The occupant sensor 13 formed by a proximity sensor of a capacitance sensing type or an impedance change sensing type is disposed in a seatback Sb of the seat S. The occupant sensor 13 detects the presence or absence of an occupant of the seat S on the basis of a capacitance or an impedance change that is caused by the proximity of an occupant to a sensing portion or the contact of an occupant therewith. The occupant sensor 13 detects whether an occupant of the seat S is present unless an occupant whose constitution or body size is smaller than a predetermined level is leaning against the door D of the vehicle body (i.e., a side vehicle body portion).

Figure 3:
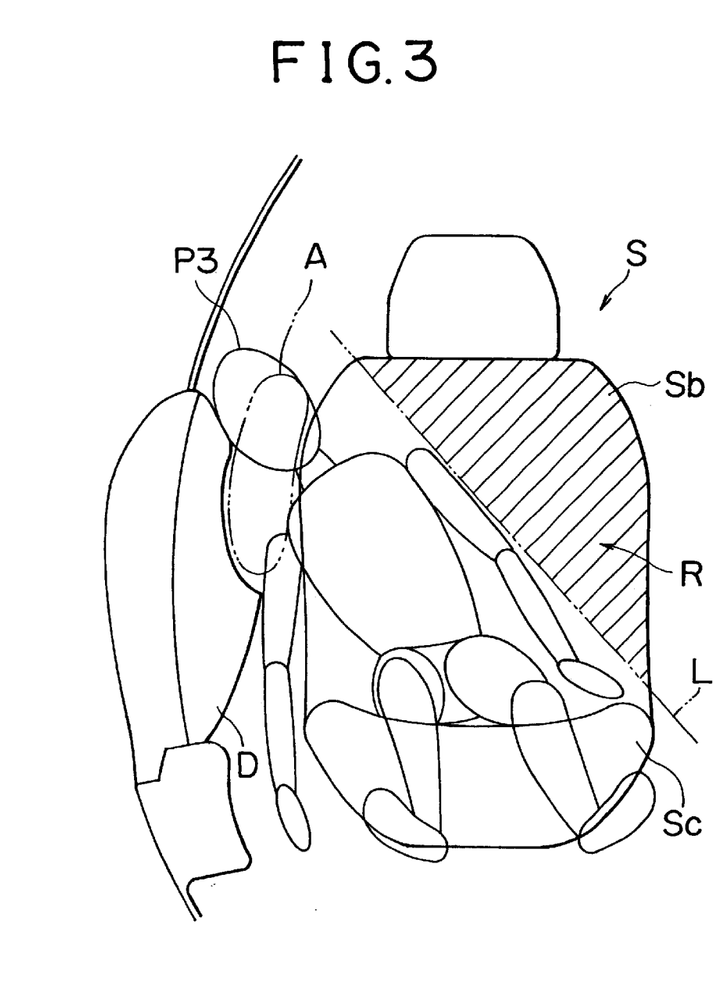
FIG. 3 is a schematic illustration of sitting posture of an occupant.

In order to make possible the aforementioned detection, the position and the shape of the detection range Z of the occupant sensor 13 are set as described below. FIG. 3 illustrates a case where an occupant having a minimum constitution that can be detected by the occupant sensor 13 is present even if the occupant is leaning against the door D, that is, an occupant P3 having exactly the predetermined constitution is in the seat S leaning against the door D.

A straight line L in FIG. 3 passes along portions of the vehicle center-side contour of the body of the occupant P3 having the predetermined constitution. If the occupant has a constitution greater than the predetermined constitution, a portion of the body of the occupant P3 contacts the straight line L or extends beyond the straight line L into a region R between the straight line L and a vehicle body center, regardless of whether the occupant is leaning against the door D. If the occupant has a constitution smaller than the predetermined constitution and is leaning against the door D, the occupant's body is out of the region R between the straight line L and the vehicle body center.

If the occupant is sitting in the proper posture, a portion of the occupant's body extends beyond the straight line L into the region R regardless of whether the occupant's constitution is equal to or greater than the predetermined constitution or smaller than the predetermined constitution. If an occupant is not sitting in the seat S, no occupant's body portion is present in the region R. Therefore, if the presence or absence of an occupant's body portion on the straight line L is detected, it is possible to determine whether an occupant is present at the seat S of the vehicle, excluding a case where an occupant whose constitution is smaller than the predetermined constitution is sitting in the seat S, leaning against the door D.

In the side airbag apparatus of this embodiment, the position and the shape of the detection range Z of the occupant sensor 13 are defined as described below in order to enable effective detection while allowing minimization of the area of the detecting portion of the occupant sensor 13 and securing the required detection precision of the occupant sensor 13.

In the side airbag apparatus of the embodiment, the detection range Z of the occupant sensor 13 is defined at a position that is located in an upper portion of the seatback Sb of the seat S and shifted from the center of the seatback Sb with respect to the direction of the width thereof toward the vehicle body center, that is, toward a side portion of the seatback Sb opposite to a side portion thereof where the side airbag module 10 is disposed, or at a position that is located in an upper portion of the seatback Sb of the seat S and near the center of the seatback Sb. The shape of the detection range Z is defined as a generally inverted trapezoidal or pentagonal shape or a generally inverted triangular shape having, as an oblique line or a hypotenuse, a slotped line segment (a segment of the straight line L in FIG. 3) extending along a vehicle body center-side contour of the body of the predetermined-built occupant leaning against the door D.

FIGS. 4 through 7 illustrate relationships between the detection range Z (detecting portion) and the sitting posture of an occupant.

Figure 4:
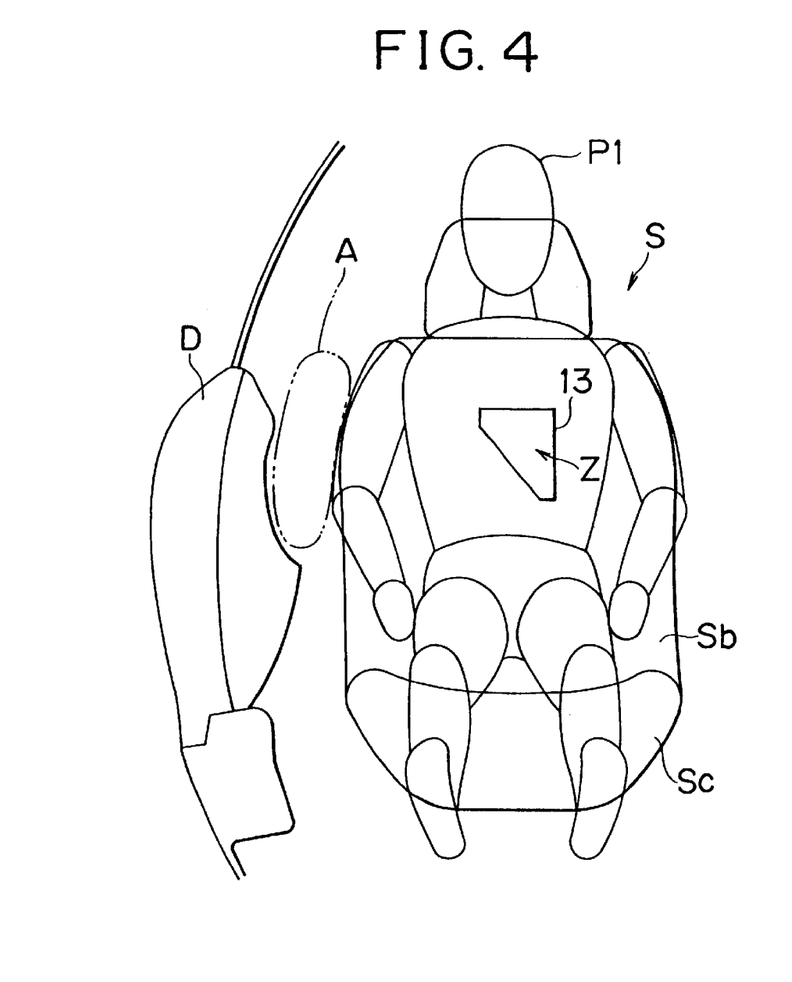
FIG. 4 is a schematic illustration of a relationship between sitting posture an occupant having a constitution equal to or greater than the predetermined constitution and a detection range of an occupant sensor of the side airbag apparatus.
Figure 5:
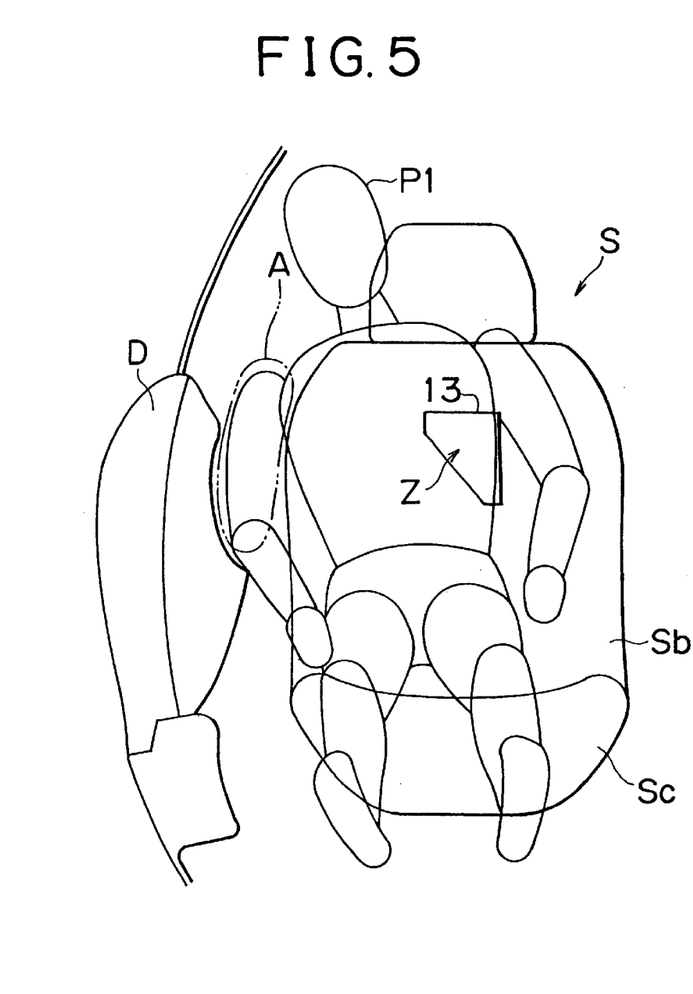
FIG. 5 is a schematic illustration of a relationship between sitting posture of an occupant having a constitution equal to or greater than the predetermined constitution and the detection range of the occupant sensor.
Figure 6:
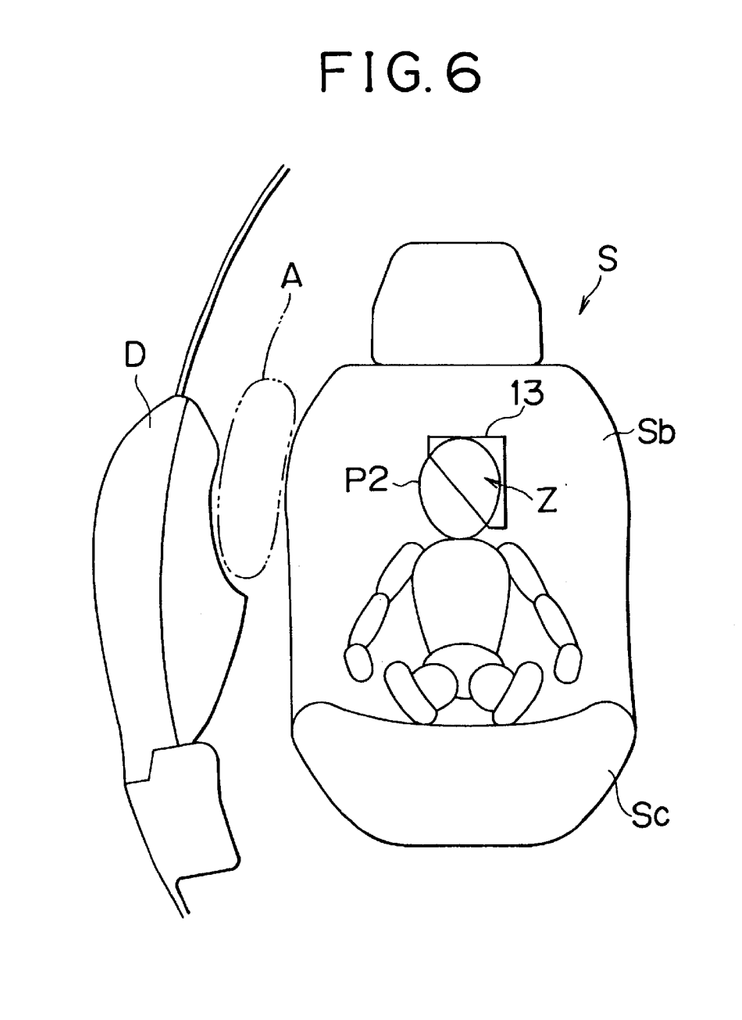
FIG. 6 is a schematic illustration of a relationship between sitting posture of an occupant having a constitution smaller than a predetermined constitution and the detection range of the occupant sensor.
Figure 7:
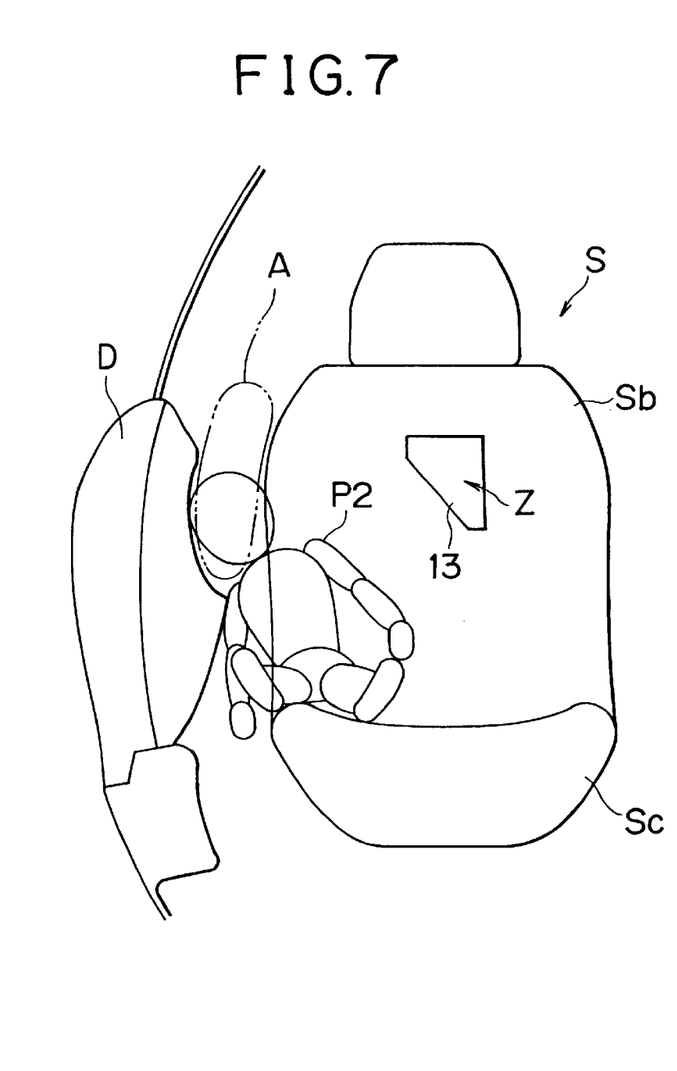
FIG. 7 is a schematic illustration of a relationship between the sitting posture of an occupant having a constitution smaller than a predetermined constitution and the detection range of the occupant sensor.

FIG. 4 illustrates an average-built occupant (an occupant having a constitution equal to or greater than the predetermined constitution) P1 sitting in a proper posture. FIG. 5 illustrates the average-built occupant P1 leaning against the door D. FIG. 6 illustrates a small-built occupant (an occupant having a constitution smaller than the predetermined constitution) P2, for example, a child or the like, sitting in a proper posture. FIG. 7 illustrates the small-built occupant P2 leaning against the door D.

Both in a case where the average-built occupant P1 is sitting in the proper posture (FIG. 4) and a case where the average-built occupant P1 is leaning against the door D (FIG. 5), the presence of the average-built occupant P1 is detected by the occupant sensor 13. In the case of the small-built occupant P2, however, the presence of the small-built occupant P2 is detected by the occupant sensor 13 if the small-built occupant P2 is sitting in the proper posture (FIG. 6), whereas the presence of the small-built occupant P2 cannot be detected by the occupant sensor 13 if the small-built occupant P2 is leaning against the door D (FIG. 7). If an occupant is not present at the seat S, the occupant sensor 13 does not detect the presence of an occupant (FIG. 2).

That is, the occupant sensor 13 detects the presence of an occupant only in the case where an average-built occupant P1 is sitting in the proper posture or leaning against door D and the case where a small-built occupant P2 is sitting in the proper posture. In the other cases, for example, in the case where a small-built occupant P2 is leaning against the door D and the case where an occupant is not present at the seat S, the occupant sensor 13 detects the absence of an occupant.

The predetermined body constitution serving as a border between occupants detectable by the occupant sensor 13 when leaning against the door D and occupants undetectable by the occupant sensor 13 when leaning against the door D is determined in accordance with the position and the shape of the detecting portion of the occupant sensor 13. That is, the occupant sensor 13 in this embodiment is able to detect the presence or absence of an occupant of the seat S, excluding a case where an occupant whose constitution is smaller than the predetermined constitution is leaning against the door D.

The side airbag control device 11 (see FIG. 1) controls the operation of the side airbag on the basis of the results of detection performed by the occupant sensor 13 and the side impact sensor 12 as mentioned above. A preparatory control for the control of the operation of the side airbag will be described below with reference to FIG. 8.

Figure 8:
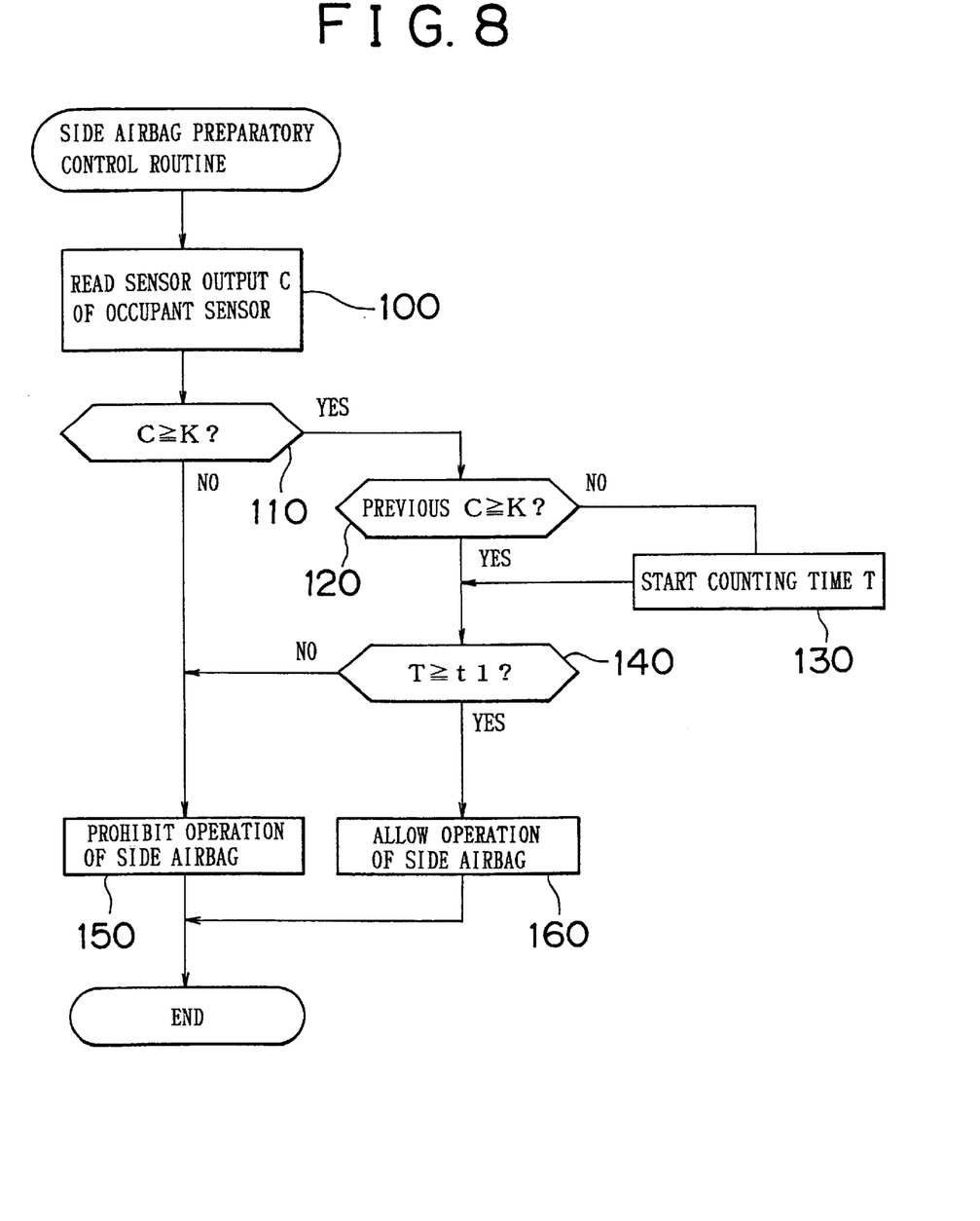
FIG. 8 is a flowchart illustrating a preparatory control routine related to the operation control of the side airbag apparatus.

FIG. 8 is a flowchart illustrating the procedure of a preparatory side airbag control routine. This routine is executed by the side airbag control device 11 as an interrupt at every predetermined length of time.

When the routine starts, the side airbag control device 11 reads a sensor output C of the occupant sensor 13 in step 100. Subsequently in step 110, the side airbag control device 11 determines whether the sensor output C is equal to or greater than a predetermined criterion K that indicates that the presence of an occupant has been detected by the occupant sensor 13.

If the sensor output C of the occupant sensor 13 is less than the predetermined criterion K (NO in step 110), the occupant sensor 13 does not detect the presence of an occupant. That is, the sensor output C indicates that an occupant is not in the seat S or that an occupant having a constitution smaller than the predetermined constitution is sitting in the seat S and leaning against the door D. Following the negative determination in step 110, the side airbag control device 11 operates to prevent the operation of the side airbag by, for example, setting an operation prohibition flag in step 150.

When the operation of the side airbag is thus prohibited, the side airbag control device 11 controls the side airbag so that the side airbag will not be operated even if an impact on a vehicle body side portion is detected by the side impact sensor 12.

The occupant protecting effect of the side airbag remarkably decreases in a case where a small-built occupant is sitting in the seat S and leaning against the door D, as stated above. In a case where an occupant is not present at the seat S, there is no need to operate the side airbag at the time of a side impact. By prohibiting the operation of the side airbag in such cases, unnecessary operation of the side airbag, that is, operation of the side airbag in a case where the occupant protecting effect is low or in a case where the operation thereof is unnecessary, can be prevented.

Conversely, if the sensor output C of the occupant sensor 13 is equal to or greater than the criterion K (YES in step 110), it means that the occupant sensor 13 has detected the presence of an occupant. In this embodiment, in particular, the presence of an occupant of the seat S can be detected by the occupant sensor 13 in various cases including the case where the occupant of the seat S has a constitution equal to or larger than the predetermined constitution and the case where the occupant of the seat S has a constitution smaller than the predetermined constitution and is sitting in the proper posture, but excluding the case where the occupant having a constitution smaller than the predetermined constitution is leaning against the door D, as described above.

Following the affirmative determination in step 110, the side airbag control device 11 determines in step 120 whether the presence of an occupant was also detected by the occupant sensor 13 during the previous interrupt. If it is determined that the presence of an occupant has been detected for the first time in the present interrupt cycle (NO in step 120), the control device 11 starts a time counter to measure an elapsed time T following the detection of the presence of an occupant in step 130. Only after the detection of the presence of an occupant continues for at least a predetermined time t1 (YES in step 140), the control device 11 permits operation of the side airbag in step 160. If the operation of the side airbag is thus permitted, the side airbag control device 11 controls the side airbag so that the side airbag is operated if an impact on-a side portion of the vehicle body is detected by the side impact sensor 12.

If an occupant is detected by the occupant sensor 13 (YES in step 110) but that detection does not continue for at least the predetermined time t1 (NO in step 140), the side airbag control device 11 prohibits the operation of the side airbag as in the case where the sensor output C of the occupant sensor 13 is less than the criterion K, for the following reason.

A portion of the body of an occupant sitting in a seat other than the seat S or a portion of the body of an occupant having a constitution smaller than the predetermined constitution and sitting in the seat S but leaning against the door D, for example, an arm of the occupant, may enter the detection range Z of the occupant sensor 13. In such a case, the sensor output C of the occupant sensor 13 becomes equal to or greater than the criterion K even though the presence of the occupant is essentially undetectable by the occupant sensor 13. Therefore, the side airbag apparatus of the embodiment prevents such a false detection by permitting the operation of the side airbag only if the detection of the presence of an occupant continues for at least the predetermined time t.

Constructed as described above, the side airbag apparatus of this embodiment achieves the following advantages.

Since the operation of the side airbag is permitted only if the presence of an occupant is detected by the occupant sensor 13, the side airbag apparatus of the embodiment prevents unnecessary operation of the side airbag in a case where an occupant is not present at the seat S and a case where an occupant having a constitution smaller than the predetermined constitution is sitting in the seat S and leaning against the door D.

Furthermore, the detection range Z of the occupant sensor 13 is defined at a position that is located in an upper portion of the seatback Sb of the seat S and shifted from the center of the seatback Sb with respect to the directions of the width thereof toward the vehicle body center, that is, toward a side portion of the seatback Sb opposite to a side portion thereof where the side airbag module 10 is disposed, or at a position that is located in an upper portion of the seatback Sb of the seat S and near the center of the seatback Sb. Therefore, it becomes possible to easily and reliably detect the presence or absence of an occupant while requiring only a simple construction, excluding a case where an occupant having a constitution smaller than the predetermined constitution is leaning against a side vehicle body portion.

Further, the shape of the detection range Z of the occupant sensor 13 is defined as a generally inverted trapezoidal or pentagonal shape or a generally inverted triangular shape having, as an oblique line or a hypotenuse, a sloped line segment extending along the contour of a vehicle body center-side portion of a predetermined-built occupant leaning against the door D. Therefore, it becomes possible to more easily and reliably detect the presence or absence of an occupant, excluding a case where an occupant having a constitution smaller than the predetermined constitution is leaning against a side vehicle body portion.

The side airbag apparatus of the embodiment permits the operation of the side airbag only if the detection of the presence of an occupant by the occupant sensor 13 continues for at least the predetermined time t1. Therefore, the side airbag apparatus prevents false detection of an occupant.

Further, since the side airbag apparatus of the embodiment employs a proximity sensor of a capacitance sensing type or an impedance change sensing type whose detection range can easily be defined as a desired shape, the occupant sensor 13 can easily be constructed.

The side airbag apparatus of the embodiment may be modified as described below.

The occupant sensor 13 is not limited to a capacitance sensing type sensor or an impedance change sensing type sensor as in the side airbag apparatus of the embodiment, but may also be changed to various other sensors, for example, a pressure-sensitive sensor, an infrared sensor, an ultrasonic sensor, or the like, as long as the sensor is capable of detecting whether an occupant is present in the detection range Z.

The position or the shape of the detection range Z of the occupant sensor 13 may be changed in any manner as long as the detection as described above is possible. However, in order to effectively perform the detection, certain conditions, for example, conditions stated below, need to be met. That is, it is preferable that the presence or absence of an occupant can be detected with respect to at least a portion of a vehicle body centerside contour of the body of a predetermined-built occupant leaning against the door D, or that the presence or absence of an occupant can be detected in a vehicle body center-side region that covers at least a portion of the aforementioned contour of the body of the occupant. More specifically, the detection range of the occupant sensor 13 needs to be set to, for example, a region that is located on or includes a segment of the straight line L extending along a vehicle body center-side contour of the body of a predetermined-built occupant P3 sitting in the seat S and leaning against the door D and that extends from or beyond the line segment toward the vehicle body center as in FIG. 3.

Although this embodiment is constructed so as to control the operation of the side airbag apparatus on the basis of the result of detection performed by the occupant sensor 13, excluding a case where an occupant having a constitution smaller than the predetermined constitution is sitting in the seat S and leaning against a side vehicle body portion (door D), the construction of the side airbag apparatus may also be modified so that the operation of the side airbag apparatus is controlled on the basis of the result of detection performed by a sensor that detects a state that an occupant having a constitution smaller than the predetermined constitution is leaning against a side vehicle body portion. The thus-modified construction makes it possible to operate the side airbag in a suitable manner, for example, such a manner that the airbag is deployed at a low pressure or a low speed, or such a manner that the airbag is deployed stepwise, that is, in a plurality of divided stages, or the like, or to prevent unnecessary operation of the side airbag, if an occupant having a constitution smaller than the predetermined constitution, for example, a child, is sitting in the seat S in a leaning posture.

Second Embodiment

A second embodiment of the side airbag apparatus of the invention will be described below.

The capacitance sensing type or impedance change sensing type proximity sensor used as the occupant sensor 13 in the first embodiment has a characteristic that the detection sensitivity changes depending on humidity. Therefore, since the sensor output C of the occupant sensor 13 changes depending on humidity even if the state of sit of an occupant remains unchanged, the precision in detecting the state of sit of an occupant is limited.

In the second embodiment of the side airbag apparatus, the sensor portion in the first embodiment is improved so as to eliminate the effect of humidity changes on the sensor output and therefore further increase the precision in detecting the state of sit of an occupant. Therefore, the side airbag apparatus in the second embodiment have substantially the same construction in most portion as in the first embodiment. Hence, portions of the second embodiment comparable to those of the first embodiment are represented by comparable reference numerals in the drawings, and will not be described again.

Figure 9:
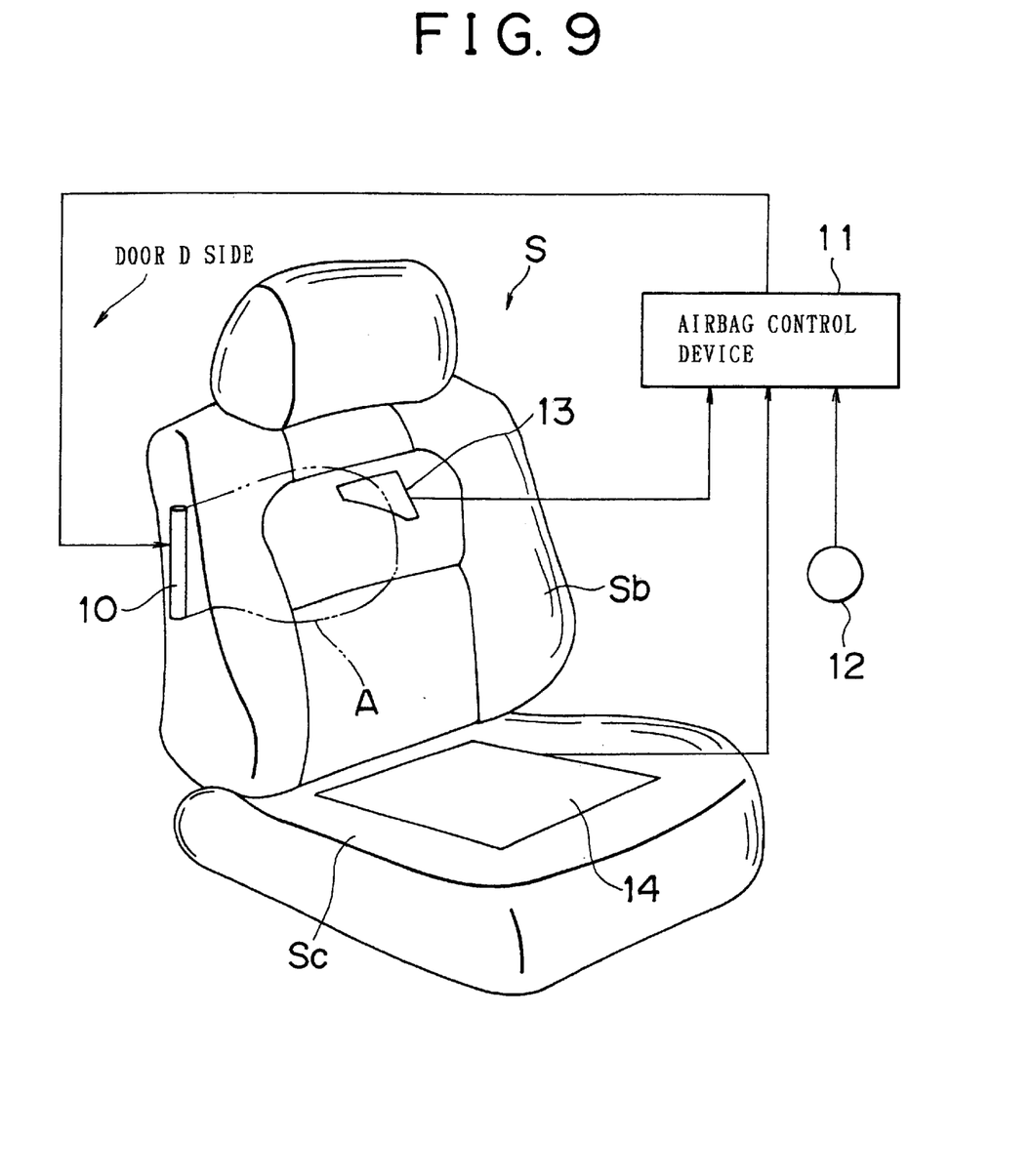
FIG. 9 is a perspective view a front seat equipped with a side airbag apparatus according to the second embodiment of the invention, together with a block diagram of an electric arrangement of the side airbag apparatus.

FIG. 9 shows a perspective view of a seat S of vehicle equipped with a side airbag apparatus according to the second embodiment, together with a block diagram of an electric arrangement of the side airbag apparatus.

The side airbag apparatus of this embodiment has sensors for detecting the state of sit of an occupant, that is, a occupant sensor 13 disposed in a seatback Sb of the seat S, and another sensor (occupancy sensor) 14 disposed in a seat cushion Sc of the seat S. The occupancy sensor 14 is formed by a pressure-sensitive sensor for detecting a pressure exerted to the seat cushion Sc when an occupant sits in the seat S. Based on the sensor output of the occupancy sensor 14, the side airbag control device 11 determines whether an occupant is present on the seat S. Unlike the occupant sensor 13, the occupancy sensor 14 simply detects only the presence or absence of an occupant of the seat S.

The side airbag apparatus of this embodiment also performs a preparatory control for the control of the operation of the side airbag in substantially the same procedure as in the first embodiment. The apparatus of the first embodiment determines the state of sit of an occupant by comparing the sensor output C of the occupant sensor 13 with the criterion K as described above. However, since the sensor output C of the occupant sensor 13 changes depending on humidity, the precision of the detection is inevitably limited. Therefore, the apparatus of the second embodiment eliminates the effect of humidity changes on the sensor output C by suitably adjusting the criterion K used in the determination of the state of sit of an occupant.

The procedure of an operation of calculating the criterion K will be described below.

Figure 10:
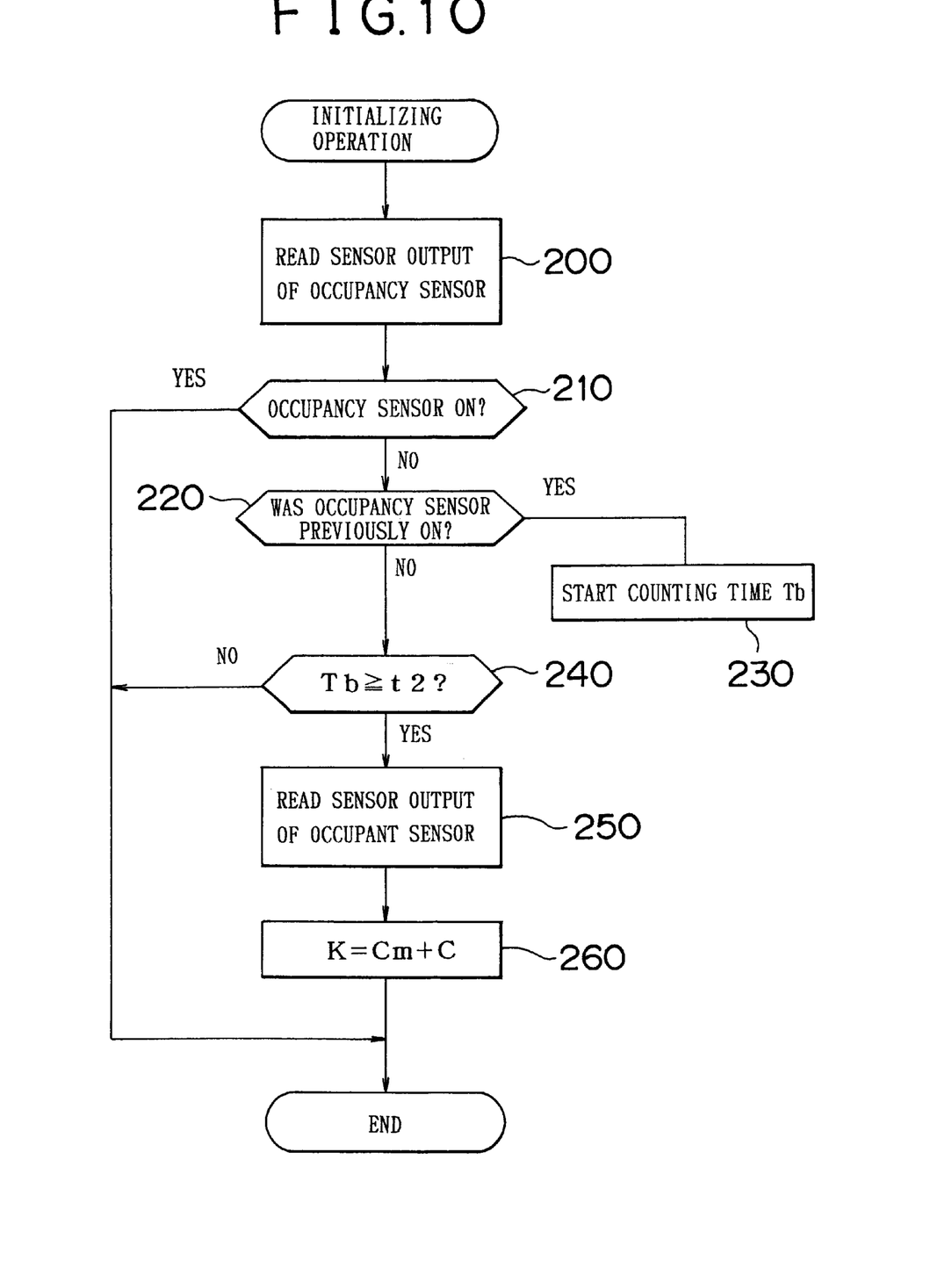
FIG. 10 is a flowchart illustrating an initializing routine related to the operation control of the side airbag apparatus according to the second embodiment.

FIG. 10 is a flowchart illustrating a procedure of an initializing operation. This routine is executed by the side airbag control device 11 as an interrupt at every predetermined length of time.

When this routine starts, the side airbag control device 11 reads the sensor output of the occupancy sensor 14 in step 200. Based on the sensor output, the side airbag control device 11 determines in step 210 whether an occupant is sitting in the seat S. If it is detected that an occupant is sitting in the seat S (YES in step 210), the side airbag control device 11 temporarily ends the execution of the routine.

Conversely, if it is detected that an occupant is not present at the seat S (NO in step 210), the side airbag control device 11 determines in step 220 whether the absence of an occupant was also detected in the previous interrupt. If the absence of an occupant has been detected for the first time in the present interrupt (YES in step 220), the control device 11 starts a counter to measure an elapsed time Tb following the detection of the absence of an occupant in step 230.

If the detection of the absence of an occupant does not continue for at least the predetermined time t2 (NO in step S240), the side airbag apparatus 11 temporarily ends the execution of the routine.

If it is determined in step 240 that the detection of the absence of an occupant by the occupancy sensor 14 has continued for at least a predetermined time t2 (YES in step 240), the side airbag control device 11 reads the sensor output C of the occupant sensor 13 in step 250. Subsequently in step 260, the control device 11 initializes the criterion K in accordance with the sensor output C. The updated value of the criterion K in this step is calculated by adding a predetermined value Cm to the read sensor output C. The predetermined value Cm added to the sensor output C corresponds to the amount of a change in the sensor output C that occurs if an occupant is present in the detection range Z of the occupant sensor 13.

After initializing the criterion K, the side airbag control device 11 temporarily ends the execution of the routine. The side airbag control device 11 uses the thus-initialized criterion K in the side airbag operation control routine (FIG. 8) to determine whether an occupant is detected by the occupant sensor 13 (steps 110 and 120 in the side airbag operation control routine).

By initializing the threshold (criterion K) of the sensor output C for determining whether an occupant is present in the detection range Z of the occupant sensor 13, the side airbag control device 11 is able to constantly and reliably determine the state of sit of an occupant regardless of a change in the sensor output C depending on a humidity change. Therefore, it becomes possible to appropriately operate the side airbag apparatus in accordance with the state of sit of an occupant.

In the above-described initializing operation, the criterion K is initialized only if the detection of the absence of an occupant continues for at least the predetermined time t2, for the following reason. That is, a portion of the body of an occupant may be present in the detection range Z of the occupant sensor 13 even though the occupancy sensor 14 detects the absence of an occupant, for example, in a case where the occupant raises a hip from the seat cushion Sc. If the aforementioned initialization is performed in such a case, the criterion K is set on the basis of the sensor output C of the occupant sensor 13 indicating the detection of the presence of an occupant. Therefore, by initializing the criterion K only after the detection of the absence of an occupant has continued for at least the predetermined time t2, the side airbag control device 11 in the second embodiment reliably determines the absence of an occupant of the seat S and prevents a false initialization of the criterion K.

The side airbag apparatus of the second embodiment achieves the following advantages in addition to the advantages as achieved by the first embodiment.

It becomes possible to constantly and reliably monitor the sitting posture of an occupant regardless of a change in the sensor output C of the occupant sensor 13 due to a humidity change. Therefore, it becomes possible to suitably operate the side airbag apparatus in accordance with the sitting posture of an occupant.

The side airbag apparatus of this embodiment may also be modified as described below.

Although the side airbag apparatus of the embodiment initializes the occupant sensor 13 by setting the criterion K for determining the presence or absence of an occupant on the basis of the sensor output C of the occupant sensor 13 occurring when the absence of an occupant of the seat S is detected, it is also possible to initialize the occupant sensor 13 by adjusting the output characteristic of the occupant sensor 13 on the basis of the sensor output C occurring at the time of detection of the absence of an occupant.

The occupancy sensor 14 is not limited to a pressure-detecting sensor used in the second embodiment, but may also be any sensor, for example, an infrared sensor, an ultrasonic sensor or the like, as long as the sensor is able to detect the. presence or absence of an occupant of the seat S and the sensor output is not much affected or not affected at all by humidity. Such a modification still achieves the same advantages as stated above.

While the constructions, operations and advantages of the first and second embodiments have been described, the invention is not limited to the foregoing embodiments or constructions. To the contrary, the invention is intended to cover various modifications and equivalent arrangements included within the spirit and scope of the invention.

For example, although in the foregoing embodiments, the operation of the side airbag is prohibited if an occupant is not detected by the occupant sensor 13, it is also possible to adopt a construction that changes the mode of operation of the side airbag apparatus, for example, reduces the deploying speed of the side airbag from the normal speed, or reduces the side airbag inflating pressure, or deploys the side airbag in divided stages, instead of prohibiting the operation of the side airbag apparatus, if an occupant is not detected by the occupant sensor 13. Such a construction makes it possible to achieve a good occupant protecting effect even if a small-built occupant is sitting in the seat and leaning against the door D and the normal mode of operation of the side airbag apparatus is not expected to achieve a good occupant protecting effect.

Furthermore, although in the foregoing embodiments, the side airbag module 10 is disposed in a side portion of the seat S, the side airbag module 10 may instead be disposed at a different site, for example, in the door D. Such a construction also achieves substantially the same advantages as achieved by the foregoing embodiments.

In some conventional vehicles, an occupant sensor is provided in a seat cushion or the like for detecting the presence or absence of an occupant in order to control various frontal impact safety devices, for example, a frontal impact airbag, a seat belt pretensioner, a head protecting airbag, for example, the curtain type airbag that is housed within the roof side rail of the vehicle so as to deploy along the side glass or other type of airbag, or the like. The occupant sensor 13 or the occupancy sensor 14 in the foregoing embodiments may also be used to control these safety devices. Through the common use of a sensor for controlling various safety devices, the entire vehicle construction can be simplified and the production cost can be reduced.

What is claimed is:

1. A side airbag apparatus for protecting an occupant by deploying a side airbag between the occupant and a side vehicle body portion at the time of an impact, comprising:

an occupant sensor that occupies a position that is located in an upper portion of a seatback of a seat of a vehicle, the sensor providing output indicative of constitution and position of an occupant in the seat; and control means for changing an operation mode of the side airbag apparatus in accordance with the output of the occupant sensor, wherein the control means at least one of:

(1) changes the operation mode if the output of the occupant sensor indicates that no occupant is present or that a first occupant having a constitution smaller than a predetermined constitution is leaning against the side vehicle body portion, and (2) does not change the operation mode if the output of the occupant sensor indicates that the first occupant is not leaning against the side vehicle body portion or that a second occupant has a constitution larger than the predetermined constitution, regardless of whether the second occupant is leaning against the side vehicle body portion.

2. A side airbag apparatus according to claim 1, wherein the occupant sensor detects whether an occupant is present with respect to one of (A) a site that is located in an upper portion of a seatback of the seat and shifted from a center of the seatback in width-wise direction thereof toward a vehicle body center and (B) a site that is located in the upper portion of the seatback of the seat and near the center of the seatback.

3. A side airbag apparatus according to claim 1, wherein the control means permits operation of the side airbag if a presence of an occupant is detected by the occupant sensor, and the control means prohibits operation of the side airbag if an absence of an occupant is detected by the occupant sensor.

4. A side airbag apparatus according to claim 3, wherein the occupant sensor detects whether an occupant is present with respect to one of (A) a site that is located in an upper portion of a seatback of the seat and shifted from a center of the seatback in directions of a width thereof toward a vehicle body center and (B) a site that is located in the upper portion of the seatback of the seat and near the center of the seatback.

5. A side airbag apparatus according to claim 4, wherein the occupant sensor has a detection range for detecting the presence of an occupant, the detection range being defined as a region that includes a vehicle body center-side body contour of an occupant having a predetermined constitution and leaning against the side vehicle body portion and that extends toward the vehicle body center.

6. A side airbag apparatus according to claim 5, wherein the detection range of the occupant sensor has a shape that is defined as a generally inverted trapezoidal shape or a generally inverted triangular shape having, as an oblique line, a sloped line segment extending along the vehicle body center-side body contour of the occupant having the predetermined constitution and leaning against the side vehicle body portion.

7. A side airbag apparatus according to claim 4, wherein the occupant, the detection range being defined as a region that does not include a vehicle body center-side body contour of an occupant whose constitution is smaller than a predetermined constitution and leaning against the side vehicle body portion and that extends toward the vehicle body center.

8. A side airbag apparatus according to claim 1, wherein the control means changes the operation mode of the side airbag only if a state detected by the occupant sensor continues for at least a predetermined length of time.

9. A side airbag apparatus according to claim 1, wherein the occupant sensor is one of a capacitance sensing type sensor and an impedance change sensing type sensor.

10. A side airbag apparatus according to claim 9, further comprising:
an occupancy sensor that detects whether an occupant is sitting in the seat, the occupancy sensor being formed by a sensor other than the capacitance sensing type sensor and the impedance change sensing type sensor; and
initialization means for initializing the occupant sensor on the basis of a result of detection performed by the occupancy sensor.

11. A side airbag apparatus according to claim 10, wherein the occupancy sensor is a pressure sensing type sensor provided in a seat cushion of the seat.

12. A side airbag apparatus according to claim 10, wherein the initialization means updates a criterion of a value of output of the occupant sensor for determining whether an occupant is present, in accordance with a value outputted by the occupant sensor when absence of an occupant is detected by the occupancy sensor.

13. A side airbag apparatus according to claim 10, wherein the initialization means initializes the occupant sensor if a state detected by the occupancy sensor continues for at least a predetermined length of time.

14. A side airbag apparatus according to claim 1, wherein the control means (1) changes the operation mode if the output of the occupant sensor indicates that no occupant is present or that the first occupant is leaning against the side vehicle body portion, and (2) does not change the operation mode if the output of the occupant sensor indicates that the first occupant is not leaning against the side vehicle body portion or that the second occupant is occupying the seat, regardless of whether the second occupant is leaning against the side vehicle body portion.

15. A side airbag apparatus for protecting an occupant by deploying a side airbag between a side portion of the occupant and a side vehicle body portion at the time of an impact, comprising
a sensor capable of detecting a state that an occupant having a constitution smaller than a predetermined constitution is leaning against a side vehicle body portion,
wherein an operation mode of the side airbag is changed in accordance with a result of detection performed by the sensor;
the side airbag apparatus further comprising a controller for changing the operation mode of the side airbag apparatus in accordance with an output of the sensor,
wherein the controller at least one of:
(1) changes the operation mode if the output of the sensor indicates that no occupant is present or that a first occupant having a constitution smaller than a predetermined constitution is leaning against the side vehicle body portion, and
(2) does not change the operation mode if the output of the sensor indicates that the first occupant is not leaning against the side vehicle body portion or that a second occupant has a constitution larger than the predetermined constitution, regardless of whether the second occupant is leaning against the side vehicle body portion.

16. A side airbag apparatus according to claim 15, wherein the sensor occupies a position that is located in an upper portion of a seatback of the seat.

17. A side airbag apparatus according to claim 15, wherein the sensor has a shape including a sloped line segment that faces the side vehicle body portion.

18. A side airbag apparatus according to claim 15, further comprising:
an occupancy sensor that detects whether an occupant is sitting in the seat, wherein the sensor is initialized on the basis of a result of detection performed by the occupancy sensor.

19. A side airbag apparatus for protecting an occupant by deploying a side airbag between the occupant and a side vehicle body portion at the time of an impact, comprising:
an occupant sensor that detects whether an occupant is present at a seat of a vehicle, the sensor detecting that an occupant is not present when an occupant having a constitution smaller than a predetermined constitution is leaning against the side vehicle body portion; and a controller, in communication with the sensor, that changes an operation mode of the side airbag apparatus in accordance with whether the occupant is present on the basis of detection by the occupant sensor.

20. A side airbag apparatus according to claim 19, wherein the occupant sensor occupies a position that is located in an upper portion of a seatback of the seat.

21. A side airbag apparatus according to claim 19, wherein the occupant sensor has a shape including a sloped line segment that faces the side vehicle body portion.

22. A side airbag apparatus according to claim 19, further comprising:

an occupancy sensor that detects whether an occupant is sitting in the seat, wherein the occupant sensor is initialized on the basis of a result of detection performed by the occupancy sensor.

23. A side airbag apparatus according to claim 9, wherein the controller at least one of:

(1) changes the operation mode if the output of the occupant sensor indicates that no occupant is present or that a first occupant having a constitution smaller than a predetermined constitution is leaning against the side vehicle body portion, and (2) does not change the operation mode if the output of the occupant sensor indicates that the first occupant is not leaning against the side vehicle body portion or that a second occupant has a constitution larger than the predetermined constitution, regardless of whether the second occupant is leaning against the side vehicle body portion.

* * * * *